United States Patent
Yu et al.

(10) Patent No.: US 7,930,297 B2
(45) Date of Patent: Apr. 19, 2011

(54) MATERIALIZED VIEW MAINTENANCE AND CHANGE TRACKING

(75) Inventors: Tsae-Feng Yu, Nashua, NH (US); John Raitto, Hollis, NH (US); Bhujanga Panchapagesan, Nashua, NH (US); Shilpa Lawande, Nashua, NH (US); Randall G. Bello, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 560 days.

(21) Appl. No.: 11/004,145

(22) Filed: Dec. 3, 2004

(65) Prior Publication Data

US 2006/0122964 A1 Jun. 8, 2006

(51) Int. Cl.
*G06F 17/30* (2006.01)

(52) U.S. Cl. ..................................... 707/717
(58) Field of Classification Search ............ 707/2, 717
See application file for complete search history.

(56) References Cited

U.S. PATENT DOCUMENTS

| | | | | |
|---|---|---|---|---|
| 6,026,390 | A * | 2/2000 | Ross et al. ................. | 707/2 |
| 6,272,502 | B1 * | 8/2001 | Lieuwen et al. ............ | 707/203 |
| 6,366,903 | B1 * | 4/2002 | Agrawal et al. ............ | 707/2 |
| 6,484,159 | B1 * | 11/2002 | Mumick et al. ............ | 707/2 |
| 6,546,381 | B1 * | 4/2003 | Subramanian et al. ...... | 707/2 |
| 6,601,073 | B1 * | 7/2003 | Robare ...................... | 707/104.1 |
| 6,931,390 | B1 * | 8/2005 | Zait et al. ................... | 707/2 |
| 7,111,020 | B1 * | 9/2006 | Gupta et al. ............... | 707/201 |
| 7,139,783 | B2 * | 11/2006 | Hinshaw et al. ............ | 707/205 |
| 7,440,963 | B1 * | 10/2008 | Bello et al. ................. | 707/3 |
| 2003/0074348 | A1 * | 4/2003 | Sinclair et al. ............. | 707/2 |
| 2003/0187864 | A1 * | 10/2003 | McGoveran ................ | 707/102 |
| 2004/0122828 | A1 * | 6/2004 | Sidle et al. ................. | 707/100 |
| 2004/0133567 | A1 * | 7/2004 | Witkowski et al. ......... | 707/3 |
| 2004/0260684 | A1 * | 12/2004 | Agrawal et al. ............ | 707/3 |
| 2005/0091180 | A1 * | 4/2005 | Peleg et al. ................. | 707/1 |
| 2005/0203933 | A1 * | 9/2005 | Chaudhuri et al. ......... | 707/101 |
| 2005/0235001 | A1 * | 10/2005 | Peleg et al. ................. | 707/200 |

OTHER PUBLICATIONS

Dougherty et al., "sed & awk: Unix Power Tools", Mar. 1997, O'Reilly Press, 2nd Ed., P. xiii, xiv, xvii,9-10, 15-16, 19, 45 63, 86-87, 204-205, 245, 251, 267.*

Gupta et al., "Materialized Views: Techniques, Implementations, and Applications", Jun. 1999, MIT Press, p. 145-207.*

Roussopoulos, et al., "The ADMS Project Views R Us", Jun. 1995, Bulletin of the Technical Committee on Data Engineering, IEEE Computer Society, p. 19-28.*

Hammer, et al., "The Stanford Data Warehousing Project", Jun. 1995, Bulletin of the Technical Committee on Data Engineering, IEEE Computer Society, p. 40-47.*

Zhou, et al., "Supporting Data Integration and Warehousing Using H2O", Jun. 1995, Bulletin of the Technical Committee on Data Engineering, IEEE Computer Society, p. 29-39.*

BMCsoftware, "Loadplus(r) for DB2 Reference Manual: Component of Database Administration for DB2", Oct. 24, 2003, Version 7.1, 588 pages. <Retrieved from the internet Nov. 23, 2008>.*

(Continued)

*Primary Examiner* — Khanh B Pham
(74) *Attorney, Agent, or Firm* — Murphy & King, P.C.

(57) ABSTRACT

A technique for refreshing materialized views in a database is disclosed. The detail table is partitioned, and changes made to the detail table are tracked with information stored, for example. Only sections in the materialized view which correspond to the partitions which include modifications made to the detail table are refreshed, thus avoiding the need of a complete refresh to overcome staleness.

31 Claims, 5 Drawing Sheets

OTHER PUBLICATIONS

Oracle, "Oracle9i Data Warehousing Guide Release 1 (9.0.1)", Dec. 2001, Part No. A90237-01, 21 pages, <Retrieved from www.cs.uvm.edu/oracle9doc/server901/a90237/refresh.htm>.*

Blakely et al, "Efficiently Updating Materialized Views", May 1986, ACM SIGMOD, p. 61-71, <Retrieved from internet Nov. 23, 2008>.*

Amiri et al, "A Self-managing Data Cache for Edge-Of-Network Web Applications", Nov. 2002, ACM CIKM'02, ACM Press, p. 177-185. <Retrieved from web Nov. 28, 2008>.*

Segev et al, "Updating Distributed Materialized Views", Jun. 1989, IEEE Transactions on Knowledge and Data Engineering, p. 173-184. <Retrieved from IEEE Xplore Nov. 27, 2008>.*

Chirkova et al, "Materializing Views with Minimal Size to Answer Queries", Jun. 2003, PODS 2003, ACM Press, p. 38-48. <Retrieved from ACM Nov. 28, 2008>.*

* cited by examiner

| DATE | STORE | SALES |
|---|---|---|
| 01/02/2001 | 0001 | $5,500 |
| 01/02/2001 | 0002 | $6,000 |
| 01/02/2001 | 0003 | $5,000 |
| ... | ... | ... |
| 07/05/2001 | 0001 | $4,500 |
| 07/05/2001 | 0002 | $7,000 |
| 07/05/2001 | 0003 | $8,000 |
| ... | ... | ... |

100 — 101 DATE, 103 STORE, 105 SALES

| DATE | MONTH | QUARTER |
|---|---|---|
| 01/02/2001 | JANUARY | Q1 |
| ... | ... | ... |
| 07/05/2001 | JULY | Q3 |
| ... | ... | ... |

110 — 111 DATE, 113 MONTH, 115 QUARTER

| STORE | REGION | STATE |
|---|---|---|
| 0001 | 94065 | CA |
| 0002 | 03064 | NH |
| 0003 | 20231 | DC |
| ... | ... | ... |

120 — 121 STORE, 123 REGION, 125 STATE

FIG. 1

MATERIALIZED VIEW MAINTENANCE AND CHANGE TRACKING

FIELD OF THE INVENTION

The present invention relates to computer database systems and more particularly to materialized view maintenance and change tracking.

BACKGROUND OF THE INVENTION

Relational databases store information in collections of tables, in which each table is organized into rows and columns. A popular application of relational database technology is data warehousing, in which an organization's data repository is designed to support the decision-making process for the organization.

FIG. 1 illustrates an exemplary database containing three tables, a sales table 100, a time table 110, and a store table 120, useful for recording and organizing information about a company's sales operation. In this example, the sales table 100 is a fact table, and the time table 110 and the store table are dimension tables. The columns of the sales table 100 hold attributes for the sales made by the company, including the date in a date column 101, the store identifier in a store column 103, and the daily sales amount in a sales column 105. Information about the daily sales of each of the company's stores is stored in a row of the sales table 100. For example, the first row has an entry on Jan. 2, 2001 (in the date column 101) for store 0001 (in the store column 103), which had sales of $5,500 (in the sales column 105). Similarly, the second row has an entry on Jan. 2, 2001 for store 0002, which had sales of $6,000, and the third row has an entry for sales of $5,000 on Jan. 2, 2001 for store 0003. The sales table 100 also has rows for the sales that occurred on Jul. 5, 2001 in the amounts of $4,500, $7,000, and $8,000 for stores 0001, 0002, and 0003, respectively.

The other tables, time table 110 and store table 120, are dimension tables, which characterize the sales table 100's date column 101 and store column 103, respectively. The time table 110 holds information in columns that indicate how the time is to be measured. In this example, the time table 110 has a date column 111, a month column 113, and a quarter column 115. The date column 111 is a unique/primary key column that organizes each date in terms of its month and quarter; e.g. date Jan. 2, 2001 has a value of January in the month column 113 and a value of Q1 in the quarter column 115, and the date Jul. 5, 2001 is in the month of July and in the Q3 quarter. The store table 120 holds information in columns that indicate how the stores are geographically located. In this example, the store table 120 has a store column 121, a region column 123, and a state column 125. The store column 121 is a unique/primary key column that organizes each unique identifier of each store, indicates the ZIP code of the store in the region column 123 and the state of the store in the state column 125; e.g. store 0001 is in the 94065 ZIP code (in the region column 123) and in California (in the state column 125). Similarly, stores 0002 and 0003 are in the 03064 and 20231 ZIP codes and in the states of New Hampshire and Washington, D.C., respectively.

A database user retrieves information from the tables of a relational database by entering input that is converted to queries by a database application, which submits the queries to a database server. In response to receiving the query, the database server accesses the tables specified in the query to determine which information within the tables satisfies the query. The information that satisfies the query is then retrieved by the database server and transmitted to the database application and ultimately presented to the user. Database servers are also capable of combining or "aggregating" information contained in different tables in response to a query. For example, one query for an exemplary database may be to list the number of stores having sales grouped by month and store.

For any given database application, the queries must conform to the rules of a particular query language. Most query languages provide users with a variety of ways to specify information to be retrieved. For example, in the Structured Query Language (SQL), the following query requests the retrieval of a list of the number of the stores having sales grouped by month and store:

[STATEMENT 1]
SELECT Time.month, Store. store, COUNT(*)
FROM Sales, Time, Store
WHERE Sales.date=Time.date AND Sales.store=Store.store
GROUP BY Time.month, Store.store;

This query performs a join operation on the sales table 100, the time table 110, and the store table 120. A join operation combines rows from two or more relational database objects, such as tables, views, or snapshots. To process a join operation, the database server combines pairs of rows that satisfy the join conditions and the other predicates. A join is performed whenever multiple tables appear in the FROM clause of a query. The SELECT list of the query can reference any of the columns from any of the base objects listed in the FROM clause. Most join queries contain a WHERE clause that contains a predicate that compares two columns, each from a different joined object. Such predicates are referred to as join conditions.

A "star query" is a specific type of query that is often used in a star schema, because techniques have been developed for the efficient processing of star queries. In particular, a star query is a query that contains one or more joins of a fact table with a corresponding dimension table, but none of the dimension tables are joined together, as specified in the join conditions. The exemplary query of STATEMENT 1 is a star query, because each dimension table, namely the time table 110 and store table 120, are joined to the fact table, i.e., sales table 100, but neither the time table 110 nor the store table 120 are joined to each other.

For various reasons, it is desirable to define views that present results of queries. For example, views are often used to provide security by hiding sensitive information or to simplify commands by hiding the complexity of the database. A view is a logical table, and as logical tables, views can be queried as if they were tables. The data that views actually present, however, is extracted or derived from other database objects, which may be tables, other views, or snapshots. Columns and tables that are mapped to a view are referred to herein as base columns and base tables or detail tables of the view, respectively.

A view is defined by metadata referred to as a view definition, which is typically in the form of a database query. For example, to create a view "RESULTS" for presenting the results of the query of STATEMENT1, the following STATEMENT2 may be issued to define the view:

[STATEMENT2]
CREATE VIEW RESULTS AS
SELECT Time.month, Store. store, COUNT (*)
FROM Sales, Time, Store
WHERE Sales.date=Time.Date AND Sales.store=Store.store
GROUP BY Time.month, Store.store;

A materialized view is a view for which a copy of the view data is stored separately from the detail tables of the materialized view. Since the view data is persistently stored, the view data is not required to be regenerated every time a query accesses the view, eliminating overhead associated with gathering and deriving the view. In order to provide up-to-date view data, however, materialized views must be maintained to reflect the current state of the detail tables. When the detail tables of a materialized view are modified, corresponding changes are made to the materialized view. Using a materialized view can lead to a cost savings compared with use of a conventional view when the materialized view presents a set of data that is infrequently changed but frequently accessed, especially when the defining query is costly to calculate.

Materialized views thus contain redundant information to improve query performance, because queries can be rerouted to reference the materialized views instead of the original set of tables. Materialized views typically contain GROUP BY and selection predicates. The sizes of the materialized views are often much smaller than those of the original tables referenced by the materialized views. Rerouted queries may have much better query response time, and the kernel of some relational database management systems route the queries according to structural features of the queries and the existing materialized views.

As discussed previously, the materialized view maintains pre-calculated data resulting from highly aggregated/joined queries. It has been increasingly and widely used in data warehouse applications to achieve high-performance query processing in accessing very large amounts of historical data. Its values can be seen in two aspects as query rewrite and incremental refresh. A query rewrite mechanism achieves better query processing performance by rewriting the given query in terms of the materialized view. The response time is thus shortened by using pre-calculated results in the materialized view. Incremental refresh of the materialized view provides a faster mechanism to synchronize the data between the detail tables and the materialized view.

Conventionally, the materialized view was "atomic" and treated as an inseparable object so that the status of its data could only be either globally fresh or globally stale, which has been a drawback that has affected the availability of the materialized view. For example, when any of the detail tables of the materialized view were updated, the materialized view immediately became globally "stale." All the data in the materialized view became distrusted and unusable in the query rewrite (unless lowering the confidence level) since there was no easy way to identify which part of the data was affected by the changes.

In materialized view maintenance, row-based incremental refresh (using a log with changed data rows) has been a data synchronization approach not needing to recalculate the data of the materialized view (i.e., complete refresh). However, the row-change-based incremental refresh has limitations. For example, when the detail table is partitioned (e.g., by range or list of values) and a partition maintenance operation (e.g., exchange partitions) occurs, the conventional row-based incremental refresh is unable to handle such partition changes. As a result, the materialized view has been restored to the fresh state through a complete refresh that is very expensive especially with a large amount of data. The use of data partitioning has become very popular and has been increasingly adopted in Online Analytical Processing (OLAP) systems and is very suitable for managing historical data. Lacking an ability to incrementally refresh the materialized view after partition maintenance operations is a disadvantage.

In addition to the limitation on the partition maintenance operation, conventional row-based incremental refresh can not perform its work without extra information. For example, when multiple mixed types of Data Manipulation Language (DML) statements (i.e., delete, insert and update) and direct loads are performed on the partitioned base tables, row-based incremental refresh is not possible without change sequence information in the log. Such sequence information is an extra logging cost and is not always specified by the user.

Therefore, there is a need for a technique for refreshing materialized views that does not require a complete refresh, and does not rely on the log for change sequence information.

SUMMARY OF THE INVENTION

These and other needs are addressed by a technique for refreshing materialized views by partitioning the detail table, tracking the changes made to the detail table with information stored, for example, in the ROWID column, and refreshing only sections in the materialized view which correspond to the partitions which include modifications made to the detail table.

Accordingly, one aspect of the invention relates to a method for refreshing a materialized view having entries based on rows in a detail table stored in a nonvolatile storage. The detail table is partitioned into a plurality of partitions, each of the rows belonging to a single one of the partitions. The method identifies a modified partition from among the partitions that contains a modified row in the detail table based on an address in the nonvolatile storage of the modified row. Only the entries in the materialized view that are based on the rows that belong to the modified partition are refreshed.

Another aspect of the invention pertains to a method for maintaining a materialized view having entries based on rows in a detail table. The detail table is partitioned into a plurality of partitions based on corresponding lists of discrete values, wherein each of the rows belongs to a single one of the partitions. A row in the detail table is modified, and a modified partition from among the partitions that the modified row belongs to is identified. Only the entries in the materialized view that are based on the rows that belong to the modified partition are refreshed.

Still another aspect of the invention involves a method for maintaining a materialized view having entries based on rows in a detail table. The detail table is partitioned into a plurality of first partitions based on a key, wherein each of the rows belongs to a single one of the first partitions. The materialized view is partitioned into a plurality of second partitions based on the key, wherein each of the entries belongs to a single one of the second partitions. One of the rows in the detail table is modified. A modified partition from among the first partitions that contains the modified row is identified. At least one of the second partitions that contain one or more entries in the materialized view that are based on rows that belong to the modified partition is identified. All the entries in the at least one of the second partitions are deleted. According to one embodiment, the entries of the at least one of the second partitions are recalculated.

Yet another aspect of the invention concerns a method for maintaining a materialized view having entries based on rows in a detail table. The detail table is partitioned into a plurality of first partitions based on a key, wherein each of the rows belongs to a single one of the partitions. The materialized view is partitioned into a plurality of second partitions based on the key, wherein each of the entries belongs to a single one of the second partitions. One of the rows in the detail table is modified. A modified partition from among the first partitions that contains the modified row is identified. At least one of the second partitions that contain one or more entries in the materialized view that are based on rows that belong to the modified partition is identified. A condition is evaluated. If the condition is evaluated to be in a first state, then all the entries in the at least one of the second partitions are deleted, wherein all the entries in the at least one of the second partitions includes an entry based on a row in the detail table that belongs to one of the first partitions other than the modified partition. The entry is inserted after all the entries in the at least one of the second partitions are deleted. If the condition is evaluated to be in a second state other than the first state, then only the entries in the at least one of the second partitions that are based on rows in the detail table that belong to the modified partition are deleted. According to an embodiment, the entries of the at least one of the second partitions are recalculated.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 depicts exemplary detail tables of an exemplary database.

DESCRIPTION OF THE PREFERRED EMBODIMENT

Figure 2:
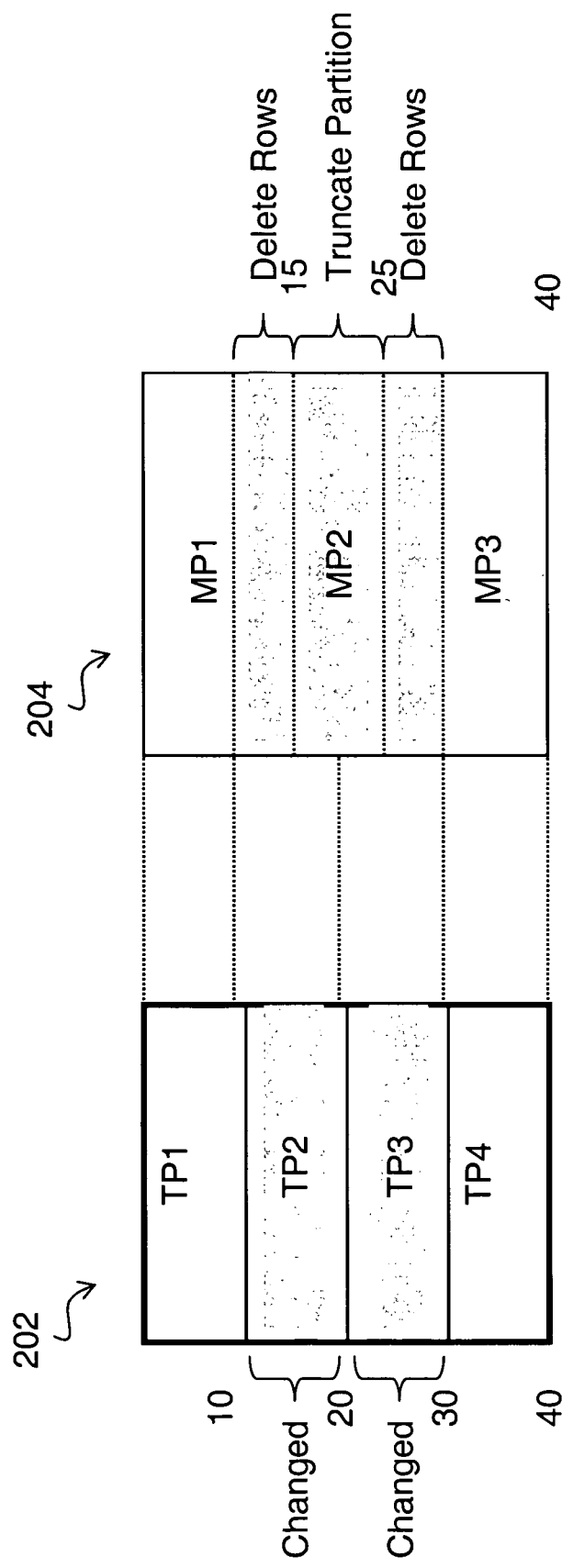
FIG. 2 depicts an exemplary modified partitioned detail table and its corresponding materialized view.

A system, method, and software for materialized view maintenance and change tracking are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Overview of Partition Change Tracking

Updating materialized views may involve incremental refresh to update partitions which have become "stale." Additionally, the materialized view may involve various forms of query rewrite, as queries on materialized views may be different from corresponding queries on base tables or detail tables used in creation of the materialized view.

Conventionally, freshness tracking for a materialized view has been all or nothing. A materialized view is initially completely fresh when created and populated but becomes completely stale when one or more of the detail tables is updated. Afterwards, the materialized view may become completely fresh again when explicitly regenerated or refreshed. However, the freshness of the detail data for a materialized view can be tracked at a finer grain of resolution than the entire materialized view. For example, when one or more detail tables that are updated are partitioned, the specific rows in the materialized view that correspond to the partition(s) in question can be identified; those rows become stale when a detail table partition is updated while all other rows remain fresh.

The ability to identify which materialized view rows correspond to a particular detail table partition can be used to support fast (incremental) refresh after partition maintenance operations on detail tables. For instance, if a detail table partition is truncated or dropped, the affected rows in the materialized view can be identified and deleted. In addition, identifying which materialized view rows are fresh or stale (rather than considering the entire materialized view as stale) allows query rewrite to use those rows that are fresh.

In the data warehouse environment, the management of historical data follows a pattern especially suitable for data partitioning. Typically, a fact table is very large and contains several years of data, and thus partitioning the table becomes a reasonable and manageable solution. When new data is added to the fact table, a new partition may be created to load the data. The data in the out-dated partitions are paged out from the fact table so that a moving window of data is maintained. This block type of data manipulations is very amenable to the use of data partitioning. The present solution works very effectively and efficiently in such applications.

An exemplary scenario is shown in FIG. 2 wherein a PCT (partition-change-table) detail table and the materialized view container table are range partitioned by the same key but their partition bounds are different. In the example, the PCT detail table T1 202 has four partitions TP1, TP2, TP3, and TP4 with high bound values 10, 20, 30, and 40, respectively. The materialized view MV1 204 has three partitions MP1, MP2, and MP3 with high bound values 15, 25, and 40, respectively. If the partitions TP2 and TP3 are modified, a TRUNCATE PARTITION operation may be used to remove rows of partition MP2 from the materialized view 204 and DELETE statements may be used to remove rows in the ranges of 10<=partition key value<15 and 25<=partition key value<30 to achieve better refresh performance. Then, the range of data in the materialized view corresponding to TP2 and TP3 are recalculated and inserted in partitions MP1, MP2, and MP3.

Figure 3:
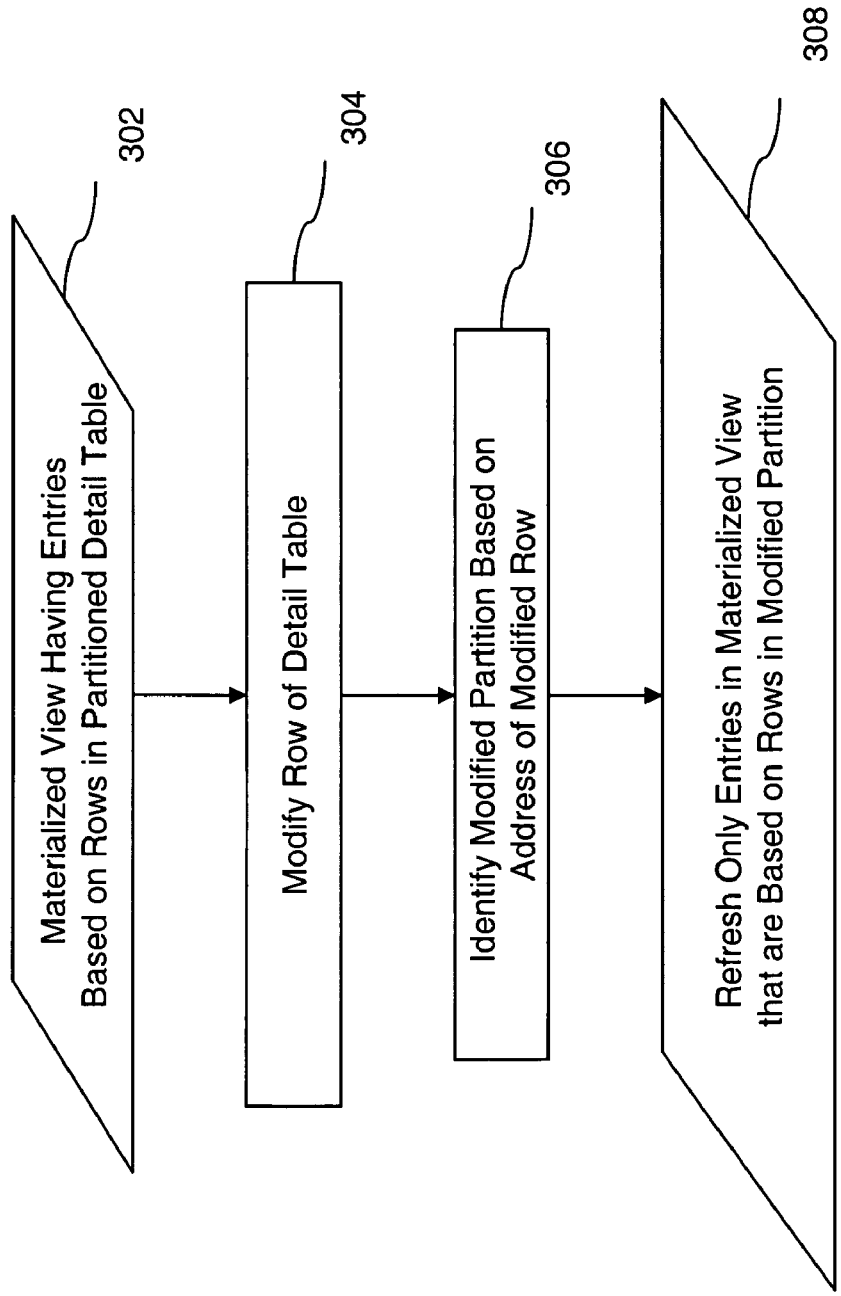
FIG. 3 depicts an exemplary flow of steps for refreshing a materialized view according to an embodiment of the present invention.

FIG. 3 illustrates exemplary steps taken to refresh, for example, the materialized view 204. At step 302, a materialized view having entries based on rows in a partitioned detail table is received. The detail table may be, for example, range partitioned or list partitioned. At step 304, a row of the detail table is modified. At step 306, a modified partition of the detail table is identified based on an address of the modified row, for example, by a value stored in the ROWID column. At step 308, only entries in the materialized view that are based on rows in the modified partition are refreshed.

Figure 4:
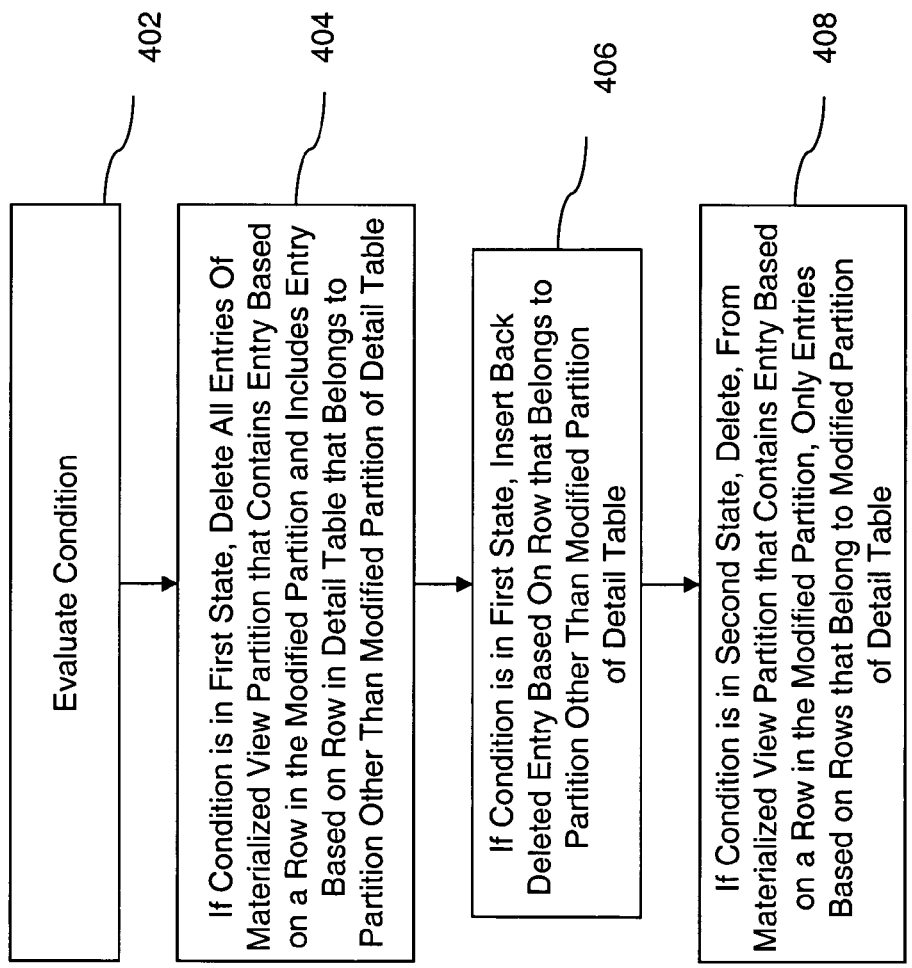
FIG. 4 depicts an exemplary flow of steps for refreshing a materialized view based on conditions according to an embodiment of the present invention.

FIG. 4 illustrates exemplary steps taken for refreshing the modified partition by checking a condition for more efficient refresh. At step 402, a condition is evaluated. The condition may include, for example, a type of update that has been performed on a row of the detail table. At step 404, if the condition is in a first state, then all entries of a materialized view partition that contains an entry based on a row in the modified partition of the detail table, and includes an entry based on a row in the detail table that belongs to a partition other than the modified partition of the detail table, are deleted. At step 406, if the condition is in the first state, then any deleted entries based on rows that belong to a partition of the detail table other than the modified partition are inserted back. At step 408, if the condition is in a second state, then only entries based on rows that belong to the modified partition of the detail table are deleted from a materialized view partition that contains an entry based on a row in the modified partition.

The system, method, and software for materialized view maintenance and change tracking achieves at least the following benefits and improvements. The materialized view is logically divided into multiple sections, or partitions, so that each of the sections has its own freshness state. Query rewrite is enabled even when the materialized view is not globally fresh, which is achieved by logically dividing the materialized view as described above. The data in the fresh sections may be used for query rewrite to speed up the query processing. A partition-change-based incremental refresh approach is provided for the materialized view. Incremental refresh therefore becomes possible after the partition maintenance operations are performed on the partitioned detail table or after some cases that can not be handled by a row-change-based refresh approach. This incremental refresh approach may deliver better refresh performance when a bigger portion of data in the detail table partition is changed.

This solution is achieved by utilizing the partitioned detail table of the materialized view. When one or more detail tables are partitioned (i.e., by range or by list of values) and the defining query of the materialized view has the partition key/marker column in its SELECT list, the partition change tracking mechanism becomes possible.

As an example, assume a materialized view MV1 is created by executing the following statement:

```
CREATE MATERIALIZED VIEW
BUILD IMMEDIATE
REFRESH ON DEMAND
ENABLE QUERY REWRITE
AS
SELECT sales.date, store.state, count (*) ct, count (sales.sales) ct_sales,
sum (sales.sales)
sum_sales
FROM sales, store
WHERE sales.store = store.store
GROUP BY sales.date, store.state;
```

In this statement, sales and store are detail tables of the materialized view, MV1. Tables sales and store are range and list partitioned, respectively. They are defined as follows:

```
CREATE TABLE SALES (date date, store number, sales number)
PARTITION BY RANGE (date)
(
partition salesp1 values less than (TO_DATE('1-Jan-2001')) tablespace
  salesw1,
partition salesp2 values less than (TO_DATE('1-Jan-2002')) tablespace
  salesw2,
partition salesp3 values less than (TO_DATE('1-Jan-2003')) tablespace
  salesw3,
partition salesp4 values less than (TO_DATE('1-Jan-2004')) tablespace
  salesw4,
partition salesp5 values less than (TO_DATE('1-Jan-2005')) tablespace
  salesw5
);
CREATE TABLE STORE (state varchar2(4), store number, region
  number)
PARTITION BY LIST (state)
(
partition storep1 values (CA, OR, WA) tablespace storew1,
partition storep2 values (MA, NH, ME, VT) tablespace storew2,
partition storep3 values (VA, NY, NJ, DE, MD) tablespace storew3,
partition storep4 values (AZ, CO) tablespace storew4,
partition storep5 values (OH, PA) tablespace storew5
);
```

The materialized view MV1 is logically partitioned into 25 (5×5) sections. As an exemplary modification scenario, the shared area (salesp3) in table Sales includes a partition containing changed data. When this happens, a system change number (scn) of the partition (salesp3) is updated to a newer value which is younger than the materialized view MV1's system change number. Then, the corresponding sections (1-Jan-2002<=sales.date<1-Jan-2003) in materialized view MV1 become stale after detecting the change. All other sections are still fresh and available for query rewrite. Such logical partitioning in the materialized view greatly improves query rewrite opportunities.

On the other hand, to deal with the affected sections of MV1 data, the partition-change-based incremental refresh is achieved by recalculating only the affected sections of data (1-Jan-2002<=sales.date<1-Jan-2003). This saves the need for performing an expensive complete refresh. In addition to this advantage, this partition-based incremental refresh can handle cases not possibly handled by the traditional row-change-based refresh. A typical example occurs when a partition maintenance operation is performed on the detail table, as conventional incremental refresh is unable to handle that case since row changes are not logged. Another example occurs when mixed DML operations are performed on the base table, and conventional incremental refresh fails to handle that case without operation sequence information. In either case, the partition-change-based incremental refresh prevails. Further, in many performance tests, the partition-based incremental refresh shows better performance than the row-change-based incremental refresh when a larger amount of data in the partition gets changed. Such scenarios are very common in the OLAP environment.

As another example, when a specific list partition in a partition-change-based detail table is modified, the corresponding rows in the materialized view may need to be recalculated. To accomplish this, an exemplary delete statement may be generated as:
DELETE FROM MV
WHERE key_col IN (value_set);

When a default list partition of the partition-change-based detail table is modified, a NOT IN ( ) clause may be generated to include all specified list values in other partitions. An exemplary delete statement may be generated as:
DELETE FROM MV
WHERE key_col NOT IN (value_sets specified in other partitions);

As a result of the modification to the detail table, corresponding values may need to be recalculated and inserted into the materialized view.

ROWID as Partition Marker

Fast refresh of materialized views with joins and aggregates or "materialized join views" may be performed using the ROWID as a partition marker. A ROWID is a pseudo-column value that identifies an address of nonvolatile memory (e.g. a disk block) that a database row is stored on. In one embodiment, if a materialized join view has multiple instances of a table in the FROM clause, then the ROWID columns for each instance must be present in the SELECT list of the materialized view. Also the materialized view log for the table must have the ROWID column in it.

If the materialized join view has an inline or named view in the FROM clause, then view merging may be done. After view merging, the materialized view satisfies usual requirements for fast refresh. In particular, the select list of the materialized view must have the ROWID columns of all the tables present in the FROM clause of the materialized view. Also, materialized view logs must be present on all the base tables and must contain the ROWID column.

If the materialized join view has remote tables in the FROM clause, all tables in the FROM clause must be located on that same site. Further, ON-COMMIT refresh is not supported for materialized views with remote tables. The logs for the materialized join view must be present on the remote site for each detail table of the materialized view and ROWID columns must be present in the SELECT list of the materialized view.

Preferably, the materialized view's defining query should satisfy the following conditions. At least one of the detail tables of the materialized view is partitioned. The partitioned tables are RANGE, LIST or COMPOSITE (i.e., RANGE-HASH or RANGE-LIST) partitioned. The materialized view should contain the detail table's partition key in its SELECT clause. If the GROUP BY clause is used then this column should also be present in the GROUP BY clause. Alternatively, a supplied partition marker function may be present in lieu of the detail table's partition key columns. If the materialized view's query does not satisfy this condition for some table (i.e., that table's partition key or marker is absent from the SELECT clause), then fast refresh may be supported as long as this table has not been modified.

Truncate Partition

Partition-change-tracking-based refresh may execute DELETE statements to remove rows regardless of whether those rows reside in the corresponding partitions of the materialized view. However, when the materialized view is partitioned like a partition-change-tracking (PCT) table, it is much more efficient to use a TRUNCATE PARTITION statement to remove a whole partition of data during refresh and then repopulate the partition with new data. This partition-change-tracking refresh enhancement may be supported under the following conditions: The partition method of both the detail table and the materialized view configures the partitions in a way such that relating the changed partitions from the detail table to the materialized view is possible. A simple example occurs when both the detail table and the materialized view are range partitioned by the same key but with different partition bounds. This design covers both one-to-one and many-to-many mapping relationships between partitions in the detail table and partitions in the materialized view.

When the affected rows in the corresponding materialized view partitions reach a certain threshold (e.g., >5%), TRUNCATE PARTITION may be used to delete the rows of data and recalculate them through INSERT. Instead of using the heuristics, an alternative is to evaluate and compare the two plans of (1) truncate partition with broader inserts and (2) deletes with specific inserts, and then select the cheaper alternative. To do this, cost evaluation functions for comparing DMLs may be used.

In order to support this type of partition-change-tracking refresh using TRUNCATE PARTITION for more efficient updates, a determination may be done to check if one of the partition-change-tracking tables and the MV container tables are both partitioned in which the changed partitions of the detail table may be related to the partitions of the materialized view. If the MV container table is partitioned by the same key as one PCT detail table, then the MV may be marked as "partition-change-tracking using truncate partition enabled." A list of combined updated partitions from the partition-change-tracking table that allows TRUNCATE PARTITIONs may be generated. Then, the list of updated partitions is used to compare with the partition bounds of the MV container table to identify which partitions in the MV are "fully covered" and those partitions can use partition operations to remove their data.

In one embodiment, TRUNCATE PARTITION statements are generated by searching and finding a partition-change-tracking table that enables TRUNCATE PARTITON in the materialized view (i.e., the partition-change-tracking has the same partition method and partition key as the materialized view container table). A list of updated partitions for the partition-change-tracking table is generated by combining the updated partitions from DML, Direct load and partition maintenance operations. The list also consolidates the adjacent partitions with combined bound information.

The list of updated partition-change-tracking partitions is then used to match with each of the materialized view container table partitions. If the materialized view container is completely covered in the list, a TRUNCATE PARTITION statement to that materialized view partition is generated and the next materialized view partition is then checked. The process continues until all materialized view partitions are checked or the end of the updated list is reached.

When the TRUNCATE PARTITION statement is generated for a materialized view partition, the updated list of partition-change-tracking partitions is adjusted accordingly by removing/replacing the truncated ranges with correct bound information.

The result of this function is a list of TRUNCATE PARTITION statements populated in the partition-change-tracking context structure and a list of updated partition-change-tracking partitions that is adjusted due to the TRUNCATE PARTITION generation. The adjusted list of updated partition-change-tracking partitions is used in the delete statement generation phase.

Hardware Overview

Figure 5:
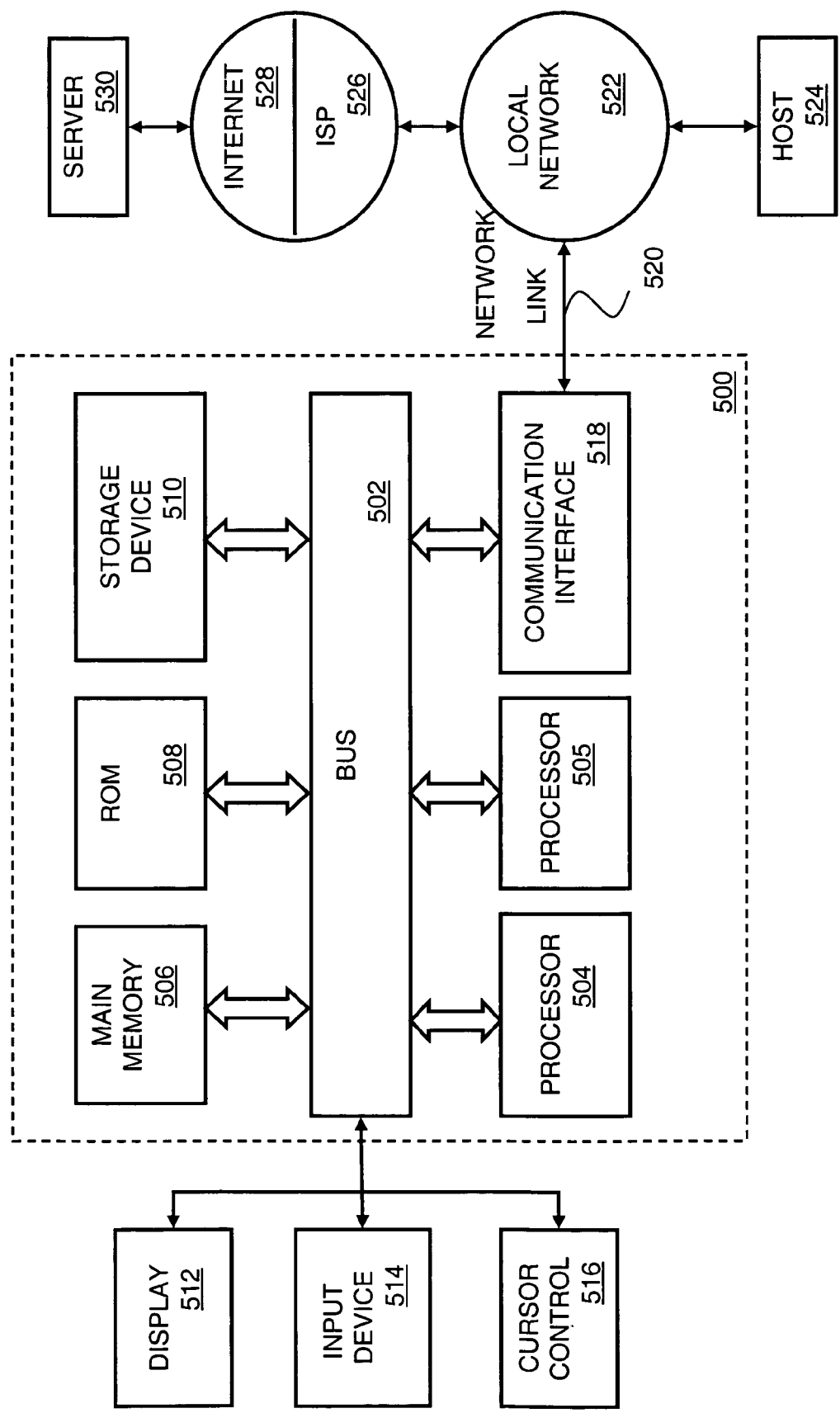
FIG. 5 depicts a computer system that can be used to implement an embodiment of the present invention.

FIG. 5 illustrates a computer system 500 upon which an embodiment according to the present invention can be implemented. The computer system 500 includes a bus 502 or other communication mechanism for communicating information and a processor 504 coupled to the bus 502 for processing information. The computer system 500 also includes main memory 506, such as a random access memory (RAM) or other dynamic storage device, coupled to the bus 502 for storing information and instructions to be executed by the processor 504. Main memory 506 can also be used for storing temporary variables or other intermediate information during execution of instructions by the processor 504. The computer system 500 may further include a read only memory (ROM) 508 or other static storage device coupled to the bus 502 for storing static information and instructions for the processor 504. A storage device 510, such as a magnetic disk or optical disk, is coupled to the bus 502 for persistently storing information and instructions.

The computer system 500 may be coupled via the bus 502 to a display 512, such as a cathode ray tube (CRT), liquid crystal display, active matrix display, or plasma display, for displaying information to a computer user. An input device 514, such as a keyboard including alphanumeric and other keys, is coupled to the bus 502 for communicating information and command selections to the processor 504. Another type of user input device is a cursor control 516, such as a mouse, a trackball, or cursor direction keys, for communicating direction information and command selections to the processor 504 and for controlling cursor movement on the display 512.

According to one embodiment of the invention, materialized view maintenance and change tracking is provided by the computer system 500 in response to the processor 504 executing an arrangement of instructions contained in main memory 506. Such instructions can be read into main memory 506 from another computer-readable medium, such as the storage device 510. Execution of the arrangement of instructions contained in main memory 506 causes the processor 504 to perform the process steps described herein. One or more processors in a multi-processing arrangement may also be employed to execute the instructions contained in main memory 506. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 500 also includes a communication interface 518 coupled to bus 502. The communication interface 518 provides a two-way data communication coupling to a network link 520 connected to a local network 522. For example, the communication interface 518 may be a digital subscriber line (DSL) card or modem, an integrated services digital network (ISDN) card, a cable modem, a telephone modem, or any other communication interface to provide a data communication connection to a corresponding type of communication line. As another example, communication interface 518 may be a local area network (LAN) card (e.g. for Ethernet™ or an Asynchronous Transfer Model (ATM) network) to provide a data communication connection to a compatible LAN. Wireless links can also be implemented. In any such implementation, communication interface 518 sends and receives electrical, electromagnetic, or optical signals that carry digital data streams representing various types of information. Further, the communication interface 518 can include peripheral interface devices, such as a Universal Serial Bus (USB) interface, a PCMCIA (Personal Computer Memory Card International Association) interface, etc. Although a single communication interface 518 is depicted in FIG. 5, multiple communication interfaces can also be employed.

The network link 520 typically provides data communication through one or more networks to other data devices. For example, the network link 520 may provide a connection through local network 522 to a host computer 524, which has connectivity to a network 526 (e.g. a wide area network (WAN) or the global packet data communication network now commonly referred to as the "Internet") or to data equipment operated by a service provider. The local network 522 and the network 526 both use electrical, electromagnetic, or optical signals to convey information and instructions. The signals through the various networks and the signals on the network link 520 and through the communication interface 518, which communicate digital data with the computer system 500, are exemplary forms of carrier waves bearing the information and instructions.

The computer system 500 can send messages and receive data, including program code, through the network(s), the network link 520, and the communication interface 518. In the Internet example, a server (not shown) might transmit requested code belonging to an application program for implementing an embodiment of the present invention through the network 526, the local network 522 and the communication interface 518. The processor 504 may execute the transmitted code while being received and/or store the code in the storage device 510, or other non-volatile storage for later execution. In this manner, the computer system 500 may obtain application code in the form of a carrier wave.

The term "computer-readable medium" as used herein refers to any medium that participates in providing instructions to the processor 506 for execution. Such a medium may take many forms, including but not limited to non-volatile media, volatile media, and transmission media. Non-volatile media include, for example, optical or magnetic disks, such as the storage device 510. Volatile media include dynamic memory, such as main memory 506. Transmission media include coaxial cables, copper wire and fiber optics, including the wires that comprise the bus 502. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A computer-implemented method for refreshing a materialized view having entries based on rows in a detail table stored in a nonvolatile storage, said detail table divided into multiple sections based on a specified criteria, wherein each section corresponds to a partition in a plurality of partitions and each of said rows belonging to only a single one of the partitions, said method comprising:

identifying a modified partition that contains a modified row in the detail table from among the plurality of partitions based on an address in the nonvolatile storage of the modified row;

partitioning the materialized view;

evaluating a condition to determine if the condition is in one of a plurality of states; when the condition is evaluated to be in a first state, refreshing only the entries in a partition of the materialized view that contains an entry that is based on rows that belong to the modified partition by recalculating data in the entries and storing the recalculated data in the respective entries so that they reflect the modification to the modified row; and when the condition is evaluated to be in a second state, refreshing by deleting all the entries in a partition of the materialized view that contains an entry that is based on the rows that belong to the modified partition and includes an entry based on a row in the detail table that belongs to a partition in the plurality of partitions other than the modified partition.

2. A method according to claim 1, wherein the modified row includes one of an inserted row, an updated row, and a deleted row.

3. A method according to claim 1, further comprising:

generating a refresh statement that accesses a row identifier from the materialized view and identifies the modified partition for the modified row based on the accessed row identifier, wherein the materialized view includes a column for storing the row identifier and the row identifier indicates a location of the modified row at the address in the nonvolatile storage.

4. A method according to claim 3, wherein said refreshing includes executing the refresh statement.

5. The method according to claim 1, wherein when the condition is evaluated to be in a second state, further comprising inserting back any entries deleted based on a row in the detail table that belongs to one of the first partitions other than the modified partition after said deleting.

6. A computer-implemented method for refreshing a materialized view having entries based on rows in a detail table, comprising:

dividing the detail table into multiple sections based on corresponding lists of discrete values, wherein each section corresponds to a partition in a plurality of partitions and wherein each of said rows belongs to only a single one of the partitions;

modifying a row in the detail table;

identifying a modified partition that the modified row belongs to from among the plurality of partitions;

partitioning the materialized view;

evaluating a condition to determine if the condition is in one of a plurality of states; when the condition is evaluated to be in a first state, refreshing only the entries in a partition of the materialized view that contains an entry that is based on the rows that belong to the modified partition by recalculating data in the entries and storing the recalculated data in the respective entries so that they reflect the modification to the modified row; and when the condition is evaluated to be in a second state, refreshing by deleting all the entries in a partition of the materialized view that contains an entry that is based on the rows that belong to the modified partition and includes an entry based on a row in the detail table that belongs to a partition in the plurality of partitions other than the modified partition.

7. A method according to claim 6, wherein modifying the row includes one of inserting the row in the detail table, updating the row in the detail table, and deleting the row in the detail table.

8. A method according to claim 6, further comprising generating a refresh statement that has an clause including one of the list of discrete values corresponding to the modified partition.

9. A method according to claim 8, wherein said refreshing includes executing the refresh statement.

10. The method according to claim 6, wherein when the condition is evaluated to be in a second state, further comprising inserting back any entries deleted based on a row in the detail table that belongs to one of the first partitions other than the modified partition after said deleting.

11. A computer-implemented method for refreshing a materialized view having entries based on rows in a detail table, comprising:

dividing the detail table into multiple sections based on a key, wherein each section corresponds to a partition in a plurality of partitions and wherein each of said rows belongs to only a single one of the first partitions;

partitioning the materialized view into a plurality of second partitions based on the key, wherein each of said entries belongs to a single one of the second partitions;

modifying one of the rows in the detail table;

identifying a modified partition that contains the modified row from among the plurality of first partitions;

identifying at least one partition in the plurality of second partitions of the materialized view that contains one or more entries that are based on rows that belong to the modified partition;

evaluating a condition to determine if the condition is in one of a plurality of states; when the condition is evaluated to be in a first state, and refreshing only the entries in a partition in the plurality of second partitions of the materialized view that contains an entry that is based on the rows that belong to the modified partition by storing the recalculated data in the respective entries so that they reflect the modification to the modified row; and when the condition is evaluated to be in a second state, refreshing by deleting all the entries in a partition in the plurality of second partitions of the materialized view that contains an entry that is based on the rows that belong to the modified partition and includes an entry based on a row in the detail table that belongs to a partition in the plurality of first partitions other than the modified partition.

12. A method according to claim 11, further comprising recalculating said entries of said at least one of the second partitions.

13. A method according to claim 11, wherein said at least one of the second partitions contains at least one entry that is based on a row in the detail table that belongs to one of the first partitions other than the modified partition.

14. A method according to claim 13, wherein the row in the detail table that belongs to the one of the first partitions other than the modified partition includes a row in the detail table that belongs to a partition that has not been modified since a most recent refreshing of the materialized view.

15. A method according to claim 13, further comprising: inserting said at least one entry that is based on the row in the detail table that belongs to the one of the first partitions other than the modified partition after said deleting all the entries.

16. A method according to claim 11, wherein said deleting in said at least one of the second partitions includes executing a statement specifying said at least one of the second partitions.

17. The method according to claim 11, wherein when the condition is evaluated to be in a second state, further comprising inserting back any entries deleted based on a row in the detail table that belongs to one of the first partitions other than the modified partition after said deleting.

18. A computer-implemented method for maintaining a materialized view having entries based on rows in a detail table, comprising:
    dividing the detail table into multiple sections based on a key, wherein each section corresponds to a partition in a plurality of partitions and wherein each of said rows belongs to only a single one of the first partitions;
    partitioning the materialized view into a plurality of second partitions based on the key, wherein each of said entries belongs to a single one of the second partitions;
    modifying one of the rows in the detail table; identifying a modified partition that contains the modified row from among the plurality of first partitions;
    identifying at least one partition in the plurality of second partitions of the materialized view that contains one or more entries that are based on rows that belong to the modified partition;
    evaluating a condition to determine if the condition is in one of a plurality of states; when the condition is evaluated to be in a first state, then performing the steps of:
    deleting all the entries in a partition in the plurality of second partitions of the materialized view that contains an entry that is based on the rows that belong to the modified partition and includes an entry based on a row in the detail table that belongs to in the plurality of first partitions other than the modified partition; and
    inserting back any entries deleted based on a row in the detail table that belongs to one of the partitions in the plurality of first partitions other than the modified partition after said deleting; and
    when the condition is evaluated to be in a second state other than the first state, then deleting only the entries in a partition in the plurality of second partitions of the materialized view that contains an entry that is based on the rows that belong to the modified partition.

19. A method according to claim 18, further comprising recalculating said entries of said at least one of the second partitions.

20. A method according to claim 18, wherein the row in the detail table that belongs to the one of the first partitions other than the modified partition includes a row in the detail table that belongs to a partition that has not been modified since a most recent refreshing of the materialized view.

21. A method according to claim 18, wherein said deleting all the entries in said at least one of the second partitions includes executing a statement specifying said at least one of the second partitions.

22. A method according to claim 18, wherein evaluating the condition includes determining whether a number of rows in said at least one of the second partitions that belong to one or more modified partitions exceeds a predetermined threshold.

23. A method according to claim 18, wherein evaluating the condition includes determining a cost of performing at least one data manipulation operation.

24. A system for refreshing a materialized view having entries based on rows in a detail table stored in a nonvolatile storage, said detail table divided into multiple sections based on a specified criteria, wherein each section corresponds to a partition in a plurality of partitions and each of said rows belonging to only a single one of the partitions comprising:
    a processor operable to execute computer program instructions;
    a tangible computer readable storage medium to store computer program instructions executable by the processor; and
    computer program instructions stored in the tangible computer readable storage medium and executable to perform the steps of:
    identifying a modified partition that contains a modified row in the detail table from among the plurality of partitions based on an address in the nonvolatile storage of the modified row;
    partitioning the materialized view;
    evaluating a condition to determine if the condition is in one of a plurality of states; when the condition is evaluated to be in a first state, refreshing only the entries in a partition of the materialized view that contains an entry that is based on rows that belong to the modified partition by recalculating data in the entries and storing the recalculated data in the respective entries so that they reflect the modification to the modified row; and
    when the condition is evaluated to be in a second state, refreshing by deleting all the entries in a partition of the materialized view that contains an entry that is based on the rows that belong to the modified partition and includes an entry based on a row in the detail table that belongs to a partition in the plurality of partitions other than the modified partition.
    a processor operable to execute computer program instructions;
    a tangible computer readable storage medium to store computer program instructions executable by the processor; and 25. A system for refreshing a materialized view having entries based on rows in a detail table comprising:
    a processor operable to execute computer program instructions;
    a tangible computer readable storage medium to store computer program instructions executable by the processor; and computer program instructions stored in the tangible computer readable storage medium and executable to perform the steps of:
    dividing the detail table into multiple sections based on corresponding lists of discrete values, wherein each section corresponds to a partition in a plurality of partitions and wherein each of said rows belongs to only a single one of the partitions;

modifying a row in the detail table;
identifying a modified partition that the modified row belongs to from among the plurality of partitions;
partitioning the materialized view;
evaluating a condition to determine if the condition is in one of a plurality of states; when the condition is evaluated to be in a first state, refreshing only the entries in a partition of the materialized view that contains an entry that is based on the rows that belong to the modified partition by recalculating data in the entries and storing the recalculated data in the respective entries so that they reflect the modification to the modified row; and
when the condition is evaluated to be in a second state, refreshing by deleting all the entries in a partition of the materialized view that contains an entry that is based on the rows that belong to the modified partition and includes an entry based on a row in the detail table that belongs to a partition in the plurality of partitions other than the modified partition.

26. A system for refreshing a materialized view having entries based on rows in a detail table comprising:
a processor operable to execute computer program instructions;
a tangible computer readable storage medium to store computer program instructions executable by the processor; and
computer program instructions stored in the tangible computer readable storage medium and executable to perform the steps of:
dividing the detail table into multiple sections based on a key, wherein each section corresponds to a partition in a plurality of partitions and wherein each of said rows belongs to only a single one of the first partitions;
partitioning the materialized view into a plurality of second partitions based on the key, wherein each of said entries belongs to a single one of the second partitions;
modifying one of the rows in the detail table;
identifying a modified partition that contains the modified row from among the plurality of first partitions;
identifying at least one partition in the plurality of second partitions of the materialized view that contains one or more entries that are based on rows that belong to the modified partition;
evaluating a condition to determine if the condition is in one of a plurality of states; when the condition is evaluated to be in a first state, and refreshing only the entries in a partition in the plurality of second partitions of the materialized view that contains an entry that is based on the rows that belong to the modified partition by storing the recalculated data in the respective entries so that they reflect the modification to the modified row; and
when the condition is evaluated to be in a second state, refreshing by deleting all the entries in a partition in the plurality of second partitions of the materialized view that contains an entry that is based on the rows that belong to the modified partition and includes an entry based on a row in the detail table that belongs to a partition in the plurality of first partitions other than the modified partition.

27. A system for refreshing a materialized view having entries based on rows in a detail table comprising:
a processor operable to execute computer program instructions;
a tangible computer readable storage medium to store computer program instructions executable by the processor; and
computer program instructions stored in the tangible computer readable storage medium and executable to perform the steps of:
dividing the detail table into multiple sections based on a key, wherein each section corresponds to a partition in a plurality of partitions and wherein each of said rows belongs to only a single one of the first partitions;
partitioning the materialized view into a plurality of second partitions based on the key, wherein each of said entries belongs to a single one of the second partitions;
modifying one of the rows in the detail table; identifying a modified partition that contains the modified row from among the plurality of first partitions;
identifying at least one partition in the plurality of second partitions of the materialized view that contains one or more entries that are based on rows that belong to the modified partition;
evaluating a condition to determine if the condition is in one of a plurality of states; when the condition is evaluated to be in a first state, then performing the steps of:
deleting all the entries in a partition in the plurality of second partitions partition of the materialized view that contains an entry that is based on the rows that belong to the modified partition and includes an entry based on a row in the detail table that belongs to in the plurality of first partitions other than the modified partition; and
inserting back any entries deleted based on a row in the detail table that belongs to one of the partitions in the plurality of first partitions other than the modified partition after said deleting; and
when the condition is evaluated to be in a second state other than the first state, then deleting only the entries in a partition in the plurality of second partitions of the materialized view that contains an entry that is based on the rows that belong to the modified partition.

28. A computer program product for refreshing a materialized view having entries based on rows in a detail table stored in a nonvolatile storage, said detail table divided into multiple sections based on a specified criteria, wherein each section corresponds to a partition in a plurality of partitions and each of said rows belonging to only a single one of the partitions comprising:
a tangible computer readable storage medium;
a processor operable to execute computer program instructions;
computer program instructions stored in the tangible computer readable storage medium and executable by the processor to perform the steps of:
identifying a modified partition that contains a modified row in the detail table from among the plurality of partitions based on an address in the nonvolatile storage of the modified row;
partitioning the materialized view;
evaluating a condition to determine if the condition is in one of a plurality of states; when the condition is evaluated to be in a first state, refreshing only the entries in a partition of the materialized view that contains an entry that is based on rows that belong to the modified partition by recalculating data in the entries and storing the recalculated data in the respective entries so that they reflect the modification to the modified row; and
when the condition is evaluated to be in a second state, refreshing by deleting all the entries in a partition of the materialized view that contains an entry that is based on the rows that belong to the modified partition and includes an entry based on a row in the detail table that belongs to a partition in the plurality of partitions other than the modified partition.

a processor operable to execute computer program instructions;

a tangible computer readable storage medium to store computer program instructions executable by the processor; and 29. A computer program product for refreshing a materialized view having entries based on rows in a detail table comprising:

a tangible computer readable storage medium;

a processor operable to execute computer program instructions; computer program instructions stored in the tangible computer readable storage medium and executable by the processor to perform the steps of:

dividing the detail table into multiple sections based on corresponding lists of discrete values, wherein each section corresponds to a partition in a plurality of partitions and wherein each of said rows belongs to only a single one of the partitions;

modifying a row in the detail table;

identifying a modified partition that the modified row belongs to from among the plurality of partitions;

partitioning the materialized view;

evaluating a condition to determine if the condition is in one of a plurality of states; when the condition is evaluated to be in a first state, refreshing only the entries in a partition of the materialized view that contains an entry that is based on the rows that belong to the modified partition by recalculating data in the entries and storing the recalculated data in the respective entries so that they reflect the modification to the modified row; and when the condition is evaluated to be in a second state, refreshing by deleting all the entries in a partition of the materialized view that contains an entry that is based on the rows that belong to the modified partition and includes an entry based on a row in the detail table that belongs to a partition in the plurality of partitions other than the modified partition.

30. A computer program product for refreshing a materialized view having entries based on rows in a detail table comprising:

a tangible computer readable storage medium;

a processor operable to execute computer program instructions;

computer program instructions stored in the tangible computer readable storage medium and executable by the processor to perform the steps of:

dividing the detail table into multiple sections based on a key, wherein each section corresponds to a partition in a plurality of partitions and wherein each of said rows belongs to only a single one of the first partitions;

partitioning the materialized view into a plurality of second partitions based on the key, wherein each of said entries belongs to a single one of the second partitions;

modifying one of the rows in the detail table;

identifying a modified partition that contains the modified row from among the plurality of first partitions;

identifying at least one partition in the plurality of second partitions of the materialized view that contains one or more entries that are based on rows that belong to the modified partition;

evaluating a condition to determine if the condition is in one of a plurality of states; when the condition is evaluated to be in a first state, and refreshing only the entries in a partition in the plurality of second partitions of the materialized view that contains an entry that is based on the rows that belong to the modified partition by storing the recalculated data in the respective entries so that they reflect the modification to the modified row; and when the condition is evaluated to be in a second state, refreshing by deleting all the entries in a partition in the plurality of second partitions of the materialized view that contains an entry that is based on the rows that belong to the modified partition and includes an entry based on a row in the detail table that belongs to a partition in the plurality of first partitions other than the modified partition.

31. A computer program product for refreshing a materialized view having entries based on rows in a detail table comprising:

a tangible computer readable storage medium;

a processor operable to execute computer program instructions;

computer program instructions stored in the tangible computer readable storage medium and executable by the processor to perform the steps of:

dividing the detail table into multiple sections based on a key, wherein each section corresponds to a partition in a plurality of partitions and wherein each of said rows belongs to only a single one of the first partitions;

partitioning the materialized view into a plurality of second partitions based on the key, wherein each of said entries belongs to a single one of the second partitions;

modifying one of the rows in the detail table; identifying a modified partition that contains the modified row from among the plurality of first partitions;

identifying at least one partition in the plurality of second partitions of the materialized view that contains one or more entries that are based on rows that belong to the modified partition;

evaluating a condition to determine if the condition is in one of a plurality of states; when the condition is evaluated to be in a first state, then performing the steps of: deleting all the entries in a partition in the plurality of second partitions partition of the materialized view that contains an entry that is based on the rows that belong to the modified partition and includes an entry based on a row in the detail table that belongs to in the plurality of first partitions other than the modified partition; and inserting back any entries deleted based on a row in the detail table that belongs to one of the partitions in the plurality of first partitions other than the modified partition after said deleting; and when the condition is evaluated to be in a second state other than the first state, then deleting only the entries in a partition in the plurality of second partitions of the materialized view that contains an entry that is based on the rows that belong to the modified partition.

* * * * *

UNITED STATES PATENT AND TRADEMARK OFFICE
CERTIFICATE OF CORRECTION

| | | |
|---|---|---|
| PATENT NO. | : 7,930,297 B2 | Page 1 of 1 |
| APPLICATION NO. | : 11/004145 | |
| DATED | : April 19, 2011 | |
| INVENTOR(S) | : Yu et al. | |

It is certified that error appears in the above-identified patent and that said Letters Patent is hereby corrected as shown below:

In column 11, line 55, delete "Model" and insert -- Mode --, therefor.

In column 16, line 49-53, in Claim 24, after "partition." delete "a processor operable to execute computer program instructions;
a tangible computer readable storage medium to store computer program instructions executable by the processor; and".

In column 18, line 23, in Claim 27, delete "partitions partition" and insert -- partitions --, therefor.

In column 19, line 4-8, in Claim 28, after "partition." delete "a processor operable to execute computer program instructions;
a tangible computer readable storage medium to store computer program instructions executable by the processor; and".

In column 20, line 46, in Claim 31, delete "partitions partition" and insert -- partitions --, therefor.

Signed and Sealed this
Eleventh Day of October, 2011

David J. Kappos
*Director of the United States Patent and Trademark Office*